Patented Oct. 18, 1949

2,485,125

UNITED STATES PATENT OFFICE 2,485,125

ESTERIFICATION OF ARYL VINYL COMPOUNDS

Joseph Marion Wilkinson, Jr., Easton, Pa., assignor to General Aniline & Film Corporation, New York, N. Y., a corporation of Delaware No Drawing. Application April 25, 1946, Serial No. 664,975

2 Claims. (Cl. 260—497)

The present invention relates to a method of preparing esters by reacting an aliphatic monocarboxylic acid with an ethylenically unsaturated aromatic compound in the presence of a strong mineral acid.

Briefly stated, the process of this invention comprises heating together an ethylenically unsaturated aromatic compound and an aliphatic monocarboxylic acid in the presence of a strong mineral acid such as sulfuric, nitric, phosphoric, hydrochloric or hydrobromic acid, for example, so as to cause the ethylenically unsaturated aromatic compound to react with the aliphatic monocarboxylic acid with a resultant formation of an aryl ester of the acid.

The reaction may be carried out at a temperature of from 50–150° and preferably within the range of 50–100° C. When the temperature employed is above the boiling point of a component of the reaction mixture, sufficient pressure is preferably maintained during the reaction to maintain liquid phase conditions, but otherwise the reaction may be carried out advantageously at atmospheric pressure.

The relative proportions in the reaction mixture of ethylenically unsaturated aromatic carbocyclic compound, aliphatic monocarboxylic acid and the catalyst (strong mineral acid) are not highly critical and may be varied through a relatively wide range. Thus, while the process is operative when a substantial excess of either ethylenically unsaturated aromatic compound or aliphatic monocarboxylic acid is employed, it is preferred to employ some excess of monocarboxylic acid since when this is done, better yields are obtained. For best results, a molar proportion of ethylenically unsaturated aromatic compound to a fatty acid of at least 1:2 is preferred. A higher ratio may be employed, but at the ratio of about 10:1 any increase in yield is relatively slight and is generally not economically feasible, although the process is operative at much higher ratios such as 20:1 or even 100:1. Likewise, the relative molar ratio of strong mineral acid to fatty acid is not highly critical and the process is operative when this ratio is varied from traces up to at least 1:1. However, in order to obtain the best results and avoid unnecessary difficulties in the purification of the product, the preferred range is within the ratio of about 1:20 to 1:2.

In order to fully illustrate the present invention, the following specific example describes in detail a preferred embodiment thereof. The parts are by weight.

*Example*

To a solution of 831 parts of glacial acetic acid and 200 parts of styrene, containing a small amount of butylcatechol as stabilizer, was added gradually with stirring at 65° C. over a period of 1 hour a solution of 150 parts of 95% nitric acid in 200 parts of glacial acetic acid. The mixture was stirred at 70° C. for 4 hours and then poured into about 2 liters of water. The hydrocarbon layer was separated by extraction with ether. The ether layer was washed successively with 5% sodium hydroxide, water, 5% sodium bisulfide, and water. The ether extract was then dried over anhydrous sodium sulfate and the ether removed under diminished pressure. After removal of the unreacted styrene by distillation, the $\alpha$-methyl benzyl acetate was isolated as a pale yellow oil, B. P. 80 C./4–5 mm.

A portion of the thus-obtained $\alpha$-methyl benzyl acetate was then converted to $\alpha$-methyl benzyl alcohol and acetophenone as follows: A solution of 41 parts of $\alpha$-methyl benzyl acetate in 120 parts of ethanol containing 75 parts 50% aqueous potassium hydroxide was heated under gentle reflux for 4 hours. The mixture was then poured into water and extracted with ether. The ether extract was then dried over anhydrous sodium sulfate and the dried extract distilled under vacuum, ether being first recovered and then $\alpha$-methyl benzyl alcohol having a boiling point of 93°–95° C. at 15 mm. The $\alpha$-methyl benzyl alcohol was then dehydrogenated to give acetophenone.

It will be understood that the above example is merely a working example of a specific embodiment of the present invention, and that the specific reaction conditions such as temperature, proportions of reactants, catalysts may be varied within the ranges heretofore mentioned.

This same procedure or indicated modifications thereof may be employed for esterifying a wide variety of ethylenically unsaturated aromatic carbocyclic compounds. As examples of compounds of this type which may be esterified by the present process there may be mentioned, in addition to styrene, vinyl naphthalene, o-, m- and p-nitrostyrene, o-, m- and p-methylstyrene, 4-chlorostyrene, 2,4-dichlorostyrene, allylbenzene, crotylbenzene, isopropenylbenzene, butenylbenzene and the like.

Since many of these ethylenically unsaturated aromatic compounds are readily polymerizable, it is preferable to incorporate in the reaction mixture an effective amount (0.1 to 10%) of a polymerization inhibitor such as the butylcatechol specified in the above example. Other polymerization inhibitors which may be substituted therefor are hydroquinone, pyrogallol, copper resinate and the like.

Similarly, a wide variety of esters of ethylenically unsaturated aromatic compounds of the type above specified may be obtained by reacting such unsaturated compounds with the aliphatic monocarboxylic acid corresponding to the ester which it is desired to obtain. While the process is particularly valuable for preparing esters of lower aliphatic acids such as propionic, butyric, isobutyric and valeric acids, in addition to acetic acid, since these types of acids react more readily and their use is more economical, particularly if the ester which is obtained is employed as an intermediate for the production, especially if the ester is to be subjected to further reactions such as hydrolysis. It will be understood that the process is operative for the production of esters of higher aliphatic acids, such as caprylic, capric, lauric, myristic, palmitic, stearic and mixtures thereof such as are obtainable by the hydrolysis of naturally-occurring glycerides.

I claim:

1. The process of producing α-methyl benzyl esters of lower aliphatic acids which comprises heating styrene in liquid phase and at atmospheric pressure to a temperature of at least 50° C. and in admixture with an excess of a lower monocarboxylic aliphatic acid in the presence of from 5% to 50%, based on the amount of said aliphatic acid, of nitric acid and a minor amount of a polymerization inhibitor for said styrene.

2. The process of producing α-methyl benzyl acetates which comprises heating styrene at atmospheric pressure to a temperature of 50–100° C. in liquid phase and in admixture with an excess of acetic acid in the presence of from 5–50%, based on the amount of said acetic acid, of nitric acid and a minor amount of a polymerization inhibitor for said styrene.

JOSEPH MARION WILKINSON, Jr.

REFERENCES CITED

The following references are of record in the file of this patent:

UNITED STATES PATENTS

| Number | Name | Date |
|---|---|---|
| 1,365,052 | Ellis | Jan. 11, 1921 |
| 2,198,046 | Vierling | Apr. 23, 1940 |